US010398039B2

(12) United States Patent
 Choi et al.

(10) Patent No.: US 10,398,039 B2
(45) Date of Patent: Aug. 27, 2019

(54) PORTABLE ELECTRONIC DEVICE AND INTERNAL STRUCTURE OF THE SAME

(71) Applicant: Samsung Electronics Co., Ltd., Suwon-si, Gyeonggi-do (KR)

(72) Inventors: Jong-Min Choi, Seongnam-si (KR); Yun-Sup Kim, Seoul (KR); Seung-Jae Ahn, Hwaseong-si (KR); Jung-Hwan Jun, Hwaseong-si (KR); Hae-Min Yoon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 47 days.

(21) Appl. No.: 15/168,533

(22) Filed: May 31, 2016

(65) Prior Publication Data

US 2017/0006715 A1 Jan. 5, 2017

(30) Foreign Application Priority Data

Jul. 3, 2015 (KR) .......................... 10-2015-0095355

(51) Int. Cl.
 *H05K 5/00* (2006.01)
 *G06F 1/16* (2006.01)
 (Continued)

(52) U.S. Cl.
 CPC ......... *H05K 5/0017* (2013.01); *G06F 1/1626* (2013.01); *G06F 1/1637* (2013.01);
 (Continued)

(58) Field of Classification Search
 CPC .. H05K 5/0017; H04M 1/185; H04M 1/0266; H04M 1/026; H04M 1/0249;
 (Continued)

(56) References Cited

U.S. PATENT DOCUMENTS

| 8,111,351 B2* | 2/2012 | Cho .................. G02F 1/133608 349/58 |
| 2004/0184224 A1* | 9/2004 | Kumagai .............. G06F 1/1616 361/679.27 |

(Continued)

FOREIGN PATENT DOCUMENTS

| EP | 2 806 418 A1 | 11/2014 |
| JP | 2011-205539 A | 10/2011 |

(Continued)

*Primary Examiner* — Steven T Sawyer
*Assistant Examiner* — Sagar Shrestha
(74) *Attorney, Agent, or Firm* — Jefferson IP Law, LLP

(57) ABSTRACT

An electronic device is provided. The electronic device includes an outer housing including a first plate, a second plate oriented in an opposite direction of the first plate, and a side member at least partially surrounding a space between the first plate and the second plate and a mid-structure disposed in the outer housing, including a first surface facing the first plate, a second plate facing the second plate, and a third plate facing at least a portion of the side member, and at least partially surrounded by the side member, wherein at least a portion of a side surface of the first plate may be surrounded by the at least a portion of the side member while spaced apart at a first interval, wherein at least a portion of the third surface of the mid-structure may be positioned adjacent to at least another portion of the side member while spaced apart from a second interval, and wherein the second interval may be smaller than the first interval.

14 Claims, 14 Drawing Sheets

(51) Int. Cl.
*H04M 1/02* (2006.01)
*H04M 1/18* (2006.01)

(52) U.S. Cl.
CPC .......... *G06F 1/1656* (2013.01); *G06F 1/1658* (2013.01); *H04M 1/026* (2013.01); *H04M 1/0249* (2013.01); *H04M 1/0266* (2013.01); *H04M 1/185* (2013.01)

(58) Field of Classification Search
CPC .... G06F 1/1656; G06F 1/1637; G06F 1/1626; G06F 1/1658
USPC ............ 361/679.01, 679.04–679.09, 679.21, 361/679.22, 679.26, 679.27, 679.29, 361/679.3, 679.55–679.58; 455/575.1–575.8; 349/58–60
See application file for complete search history.

(56) References Cited

U.S. PATENT DOCUMENTS

| | | | |
|---|---|---|---|
| 2009/0194326 A1* | 8/2009 | Morimoto | H04M 1/026 174/535 |
| 2011/0164365 A1* | 7/2011 | McClure | G06F 1/1613 361/679.3 |
| 2012/0044635 A1* | 2/2012 | Rothkopf | G06F 1/1626 361/679.54 |
| 2013/0169575 A1* | 7/2013 | Masuda | G06F 3/041 345/173 |
| 2013/0215559 A1* | 8/2013 | Kim | H05K 5/0217 361/679.01 |
| 2013/0222298 A1* | 8/2013 | Kato | G06F 3/01 345/173 |
| 2013/0257712 A1* | 10/2013 | Imamura | H01Q 1/243 345/156 |
| 2014/0055919 A1* | 2/2014 | Gu | H05K 7/1418 361/679.01 |
| 2014/0168864 A1 | 6/2014 | Lin | |
| 2014/0198464 A1 | 7/2014 | Yi et al. | |
| 2014/0268623 A1* | 9/2014 | Kim | H05K 7/14 361/809 |
| 2014/0355194 A1* | 12/2014 | Shiraishi | H04M 1/0249 361/679.26 |
| 2015/0092367 A1 | 4/2015 | Cheon | |
| 2015/0163940 A1 | 6/2015 | Scott et al. | |
| 2015/0295614 A1 | 10/2015 | Michino | |
| 2016/0033996 A1* | 2/2016 | Lee | G06F 1/1626 361/679.26 |

FOREIGN PATENT DOCUMENTS

| | | |
|---|---|---|
| JP | 2012-049671 A | 3/2012 |
| KR | 10-2014-0008612 A | 1/2014 |
| KR | 10-2014-0048754 A | 4/2014 |
| KR | 10-2015-0039538 A | 4/2015 |
| WO | 2014/076852 A1 | 5/2014 |
| WO | 2015/045250 A1 | 4/2015 |

* cited by examiner

PORTABLE ELECTRONIC DEVICE AND INTERNAL STRUCTURE OF THE SAME

CROSS-REFERENCE TO RELATED APPLICATION(S)

This application claims the benefit under 35 U.S.C. § 119(a) of a Korean patent application filed on Jul. 3, 2015 in the Korean Intellectual Property Office and assigned Serial number 10-2015-0095355, the entire disclosure of which is hereby incorporated by reference.

TECHNICAL FIELD

The present disclosure relates to electronic devices, e.g., electronic devices having a display device, and the internal structure thereof.

BACKGROUND

Generally, the electronic device performs a particular function according to its equipped program, such as a home appliance, an electronic scheduler, a portable multimedia player, a mobile communication terminal, a tablet personal computer (PC), a video/sound device, a desktop PC, a laptop computer, a navigation system, etc. For example, electronic devices may visually or aurally output information. As electronic devices are highly integrated and high-speed wireless communication becomes commonplace, mobile communication terminals are recently being equipped with various functions. For example, an electronic device may include an entertainment function, such as playing video games, a multimedia function, such as replaying music/videos, a communication and security function for mobile banking, a scheduling function, or an e-wallet function.

As the electronic device is more integrated, its size may be reduced while presenting the same performance. For example, television (TV) sets used to be typically in a box shape in the past are turning into a flat panel type and are gradually slimming down. Mobile communication terminals came in various shapes, such as in clamshell or sliding types. However, as high-speed wireless communication becomes available, bar-type terminals may be preferred for a larger screen and a slimmer body.

A display may include a display panel that outputs images or videos and a window member that transmits images generated from the display panel. The window member may be formed of transparent glass or synthetic resin for allowing images to pass therethrough while protecting the display panel from external environments. A portion of the edge of the window member may be attached to, e.g., the case of the electronic device at the periphery of the screen transmissive area to mount and fasten the window member to the electronic device. For example, the screen transmissive area may be reduced as compared with the size of the overall electronic device or the area of an overall surface of the window member.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device with a larger screen transmissive area than the area of the window member.

In accordance with an aspect of the present disclosure, an electronic device is provided. The electronic device includes a supporting member having a plurality of supporting protrusions formed along a side surface thereof, a case member coupled with the supporting member to surround the side surface of the supporting member, and a front cover coupled to a front surface of the case member, surrounded by the case member, and attached to a first surface of the supporting member. The supporting protrusions may be supported by an inside surface of the communication to couple the supporting member to the case member.

In accordance with another aspect of the present disclosure, an electronic device is provided. The electronic device includes an outer housing including a first plate, a second plate oriented in an opposite direction of the first plate, and a side member at least partially surrounding a space between the first plate and the second plate and a mid-structure disposed in the outer housing, including a first surface facing the first plate, a second surface facing the second plate, and a third surface facing at least a portion of the side member, and at least partially surrounded by the side member, wherein at least a portion of a side surface of the first plate may be surrounded by the at least a portion of the side member while spaced apart at a first interval, wherein at least a portion of the third surface of the mid-structure may be positioned adjacent to at least another portion of the side member while spaced apart from a second interval, and wherein the second interval may be smaller than the first interval.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
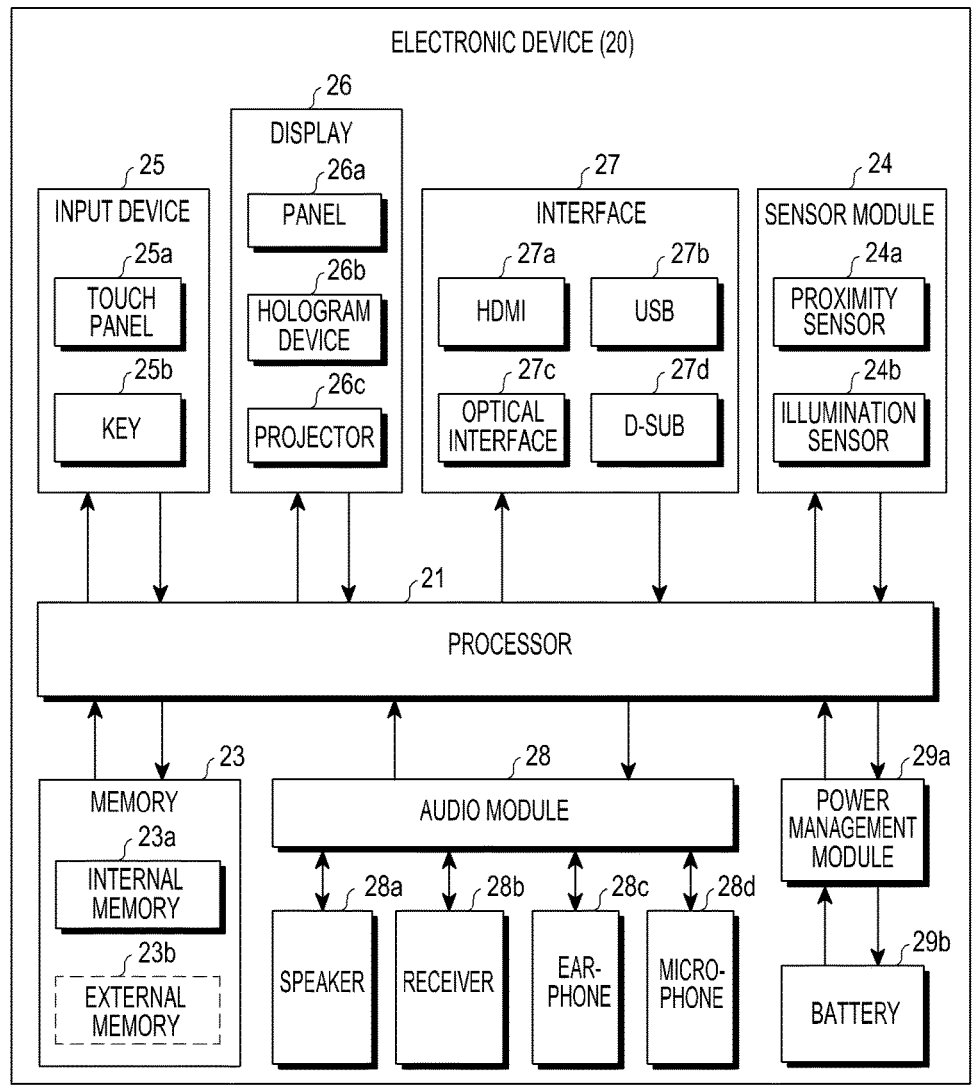
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, a "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

As used herein, the term "electronic device" may be any device with a touch panel, and the electronic device may also be referred to as a terminal, a portable terminal, a mobile terminal, a communication terminal, a portable communication terminal, a portable mobile terminal, or a display apparatus.

For example, the electronic device may be a smartphone, a mobile phone, a navigation device, a game device, a television (TV), a head unit for vehicles, a laptop computer, a tablet computer, a personal media player (PMP), or a personal digital assistant (PDA). The electronic device may be implemented as a pocket-sized portable communication terminal with a radio communication function. According to an embodiment of the present disclosure, the electronic device may be a flexible device or a flexible display.

The electronic device may communicate with an external electronic device, e.g., a server, or may perform tasks by interworking with such an external electronic device. For example, the electronic device may transmit an image captured by a camera and/or location information detected by a sensor to a server through a network. The network may include, but is not limited to, a mobile or cellular communication network, a local area network (LAN), a wireless LAN (WLAN), a wide area network (WAN), the internet, or a small area network (SAN).

FIG. 1 is a block diagram illustrating an electronic device according to an embodiment of the present disclosure.

Referring to FIG. 1, an electronic device 20 may include the whole or part of the configuration of, e.g., an electronic device described below. The electronic device 20 may include one or more processors (e.g., APs) 21, a memory 23, a sensor module 24, an input device 25, a display 26, an interface 27, an audio module 28, a power management module 29a, and a battery 29b.

The processor 21 may control multiple hardware and software components connected to the processor 21 by running, e.g., an operating system or application programs, and the processor 21 may process and compute various data. The processor 21 may be implemented in, e.g., a system on chip (SoC). According to an embodiment of the present disclosure, the processor 21 may further include a graphics processing unit (GPU) and/or an image signal processor. The processor 21 may load a command or data received from at least one of other components (e.g., a non-volatile memory) on a volatile memory, process the command or data, and store various data in the non-volatile memory.

The memory 23 may include, e.g., an internal memory 23a or an external memory 23b. The internal memory 23a may include at least one of, e.g., a volatile memory (e.g., a random access memory (RAM), a dynamic RAM (DRAM), a static RAM (SRAM), a synchronous dynamic RAM (SDRAM), etc.) or a non-volatile memory (e.g., a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 23b may include a flash drive, e.g., a compact flash (CF) memory, a secure digital (SD) memory, a micro-SD memory, a mini-SD memory, an extreme digital (xD) memory, a multi-media card (MMC), or a memory Stick™. The external memory 23b may be functionally and/or physically connected with the electronic device 20 via various interfaces.

The sensor module 24 may measure a physical quantity or detect an operational state of the electronic device 20, and the sensor module 240 may convert the measured or detected information into an electrical signal. The sensor module 24 may include at least one of, e.g., a proximity sensor 24a or an illumination sensor 24b. Additionally or alternatively, the sensing module 24 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 24 may further include a control circuit for controlling at least one or more of the sensors. According to an embodiment of the present disclosure, the electronic device 20 may further include a processor configured to control the sensor module 24 as part of the processor 21 or separately from the processor 21, and the electronic device 20 may control the sensor module 24 while the processor 21 is in a sleep mode.

The input device 25 may include, e.g., a touch panel 25a or a key 25b. The touch panel 25a may use at least one of, e.g., capacitive, resistive, IR, or ultrasonic methods. The touch panel 25a may further include a control circuit. The touch panel 25a may further include a tactile layer and may provide a user with a tactile reaction. The key 25b may include e.g., a physical button, optical key or key pad.

The display 26 may include a panel 26a, a hologram device 26b, or a projector 26c. The panel 26a may be implemented to be flexible, transparent, or wearable. The panel 26a, together with the touch panel 25a, may be configured in a single module. The hologram device 26b may display three dimensional (3D) images (holograms) in the air by using light interference. The projector 26c may display an image by projecting light onto a screen. The screen may be, for example, located inside or outside of the electronic device 20. In accordance with an embodiment, the display 26 may further include a control circuit to control the panel 26a, the hologram device 26b, or the projector 26c.

The interface 27 may include e.g., a high definition multimedia interface (HDMI) 27a, a universal serial bus (USB) 27b, an optical interface 27c, or a D-subminiature (D-sub) 27d. Additionally or alternatively, the interface 27 may include a mobile high-definition link (MHL) interface, an SD card/MMC interface, or infrared data association (IrDA) standard interface.

The audio module 28 may convert a sound into an electric signal or vice versa, for example. The audio module 28 may process sound information input or output through e.g., a speaker 28a, a receiver 28b, an earphone 28c, or a microphone 28d.

The power management module 29a may manage power of the electronic device 20, for example. Although not shown, the power management module 29a may include a power management integrated circuit (PMIC), a charger IC, or a battery or a fuel gauge. The PMIC may have a wired and/or wireless charging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for the wireless charging scheme. The battery gauge may measure an amount of remaining power of the battery 296, or may measure a voltage, a current, or a temperature while the battery 29b is being charged. The battery 29b may include, e.g., a rechargeable battery or a solar battery.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional components. Some of the components may be combined into a single entity, but the entity may perform the same functions as the components may do.

Figure 2:
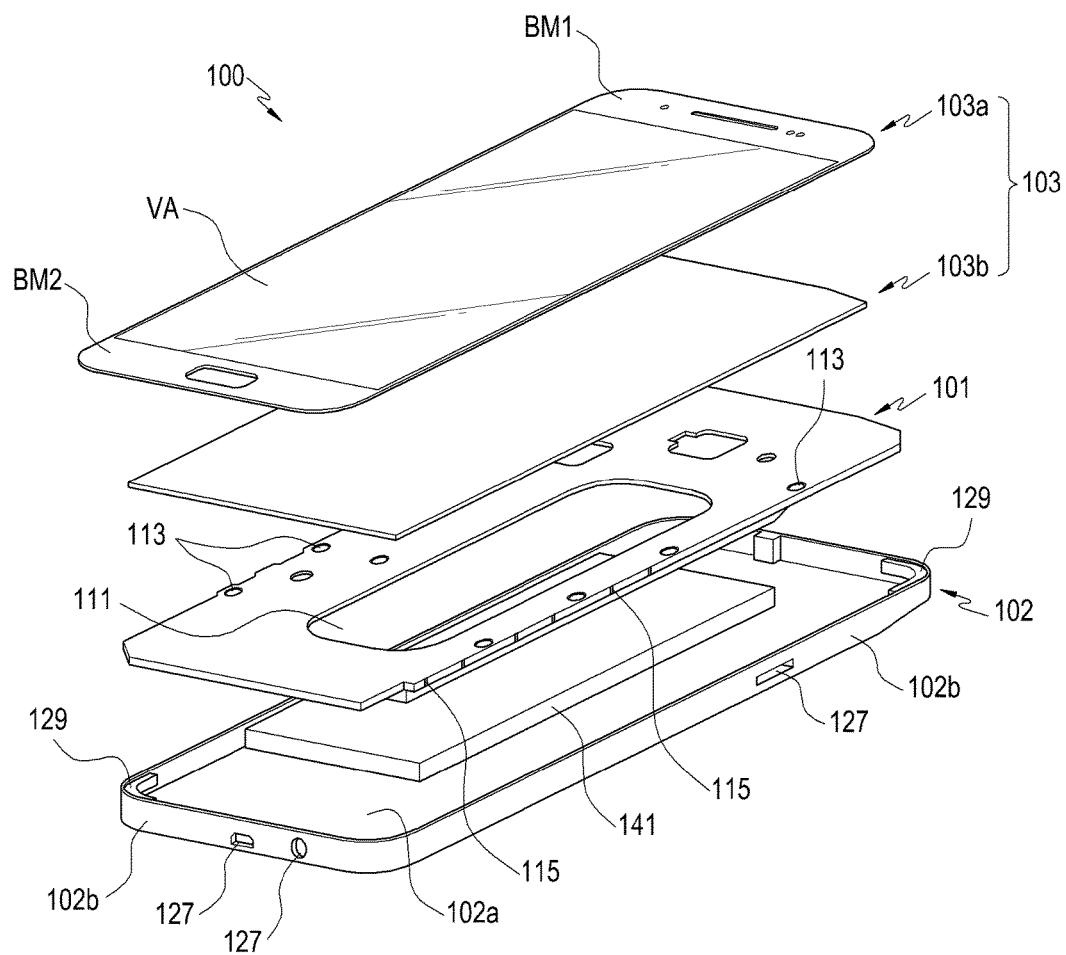
FIG. 2 is an exploded perspective view illustrating an electronic device according to an embodiment of the present disclosure.

FIG. 2 is an exploded perspective view illustrating an electronic device according to an embodiment of the present disclosure.

Referring to FIG. 2, an electronic device 100 may include all or part of the above-described electronic device 20 and may include a supporting member 101, a case member 102, and a front cover 103.

According to an embodiment of the present disclosure, the supporting member 101 may support or fix the front cover 103 and may at least partially contain a metallic material to maintain or reinforce the stiffness of the electronic device 100. The front cover 103 may include a display panel 103b (e.g., the above-described panel 26a). The supporting member 101 may support or protect the display panel 103b. For example, all or some of various electronic parts, e.g., the above-described processor 21, audio module 28 and/or the sensor module 24 may be arranged inside the electronic device 100 in an integrated circuit (IC) chip, and the supporting member 101 may prevent interference with the electronic parts by the display panel 103b. According to an embodiment of the present disclosure, the supporting member 101 may be utilized as a shield member to prevent electromagnetic interference between the electronic parts.

According to an embodiment of the present disclosure, the supporting member 101 may have an opening 111 to pass through the front and rear surfaces thereof. The opening 111 may be formed in at least a portion of an area corresponding to the battery 141 (e.g., the above-described battery 29b). The battery 141 may partially be positioned on the opening 111. One or more clamping bosses 113 may be formed at the edge of the opening 111 or the periphery of the supporting member 101. The clamping bosses 113 may have a depressed shape on a surface of the supporting member 101 and a protruding shape on the other surface of the supporting member 101. According to an embodiment of the present disclosure, the clamping bosses 113 may have a depressed shape on the other surface of the supporting member 101. The clamping bosses 113 may fasten the supporting member 101 to the case member 102. The supporting member 101, although generally shaped as a flat plate, may be reinforced for stiffness by the clamping bosses 113 protruding from any one surface and formed in the supporting member 101. For example, if the supporting member 101 is simply formed in a flat shape, the supporting member 101 may be easily deformed by a bending force or a twisting force, but the clamping bosses 113 may enhance the stiffness of the supporting member 101 when the bending force or the twisting is applied to the supporting member 101. Although the same number of clamping bosses 113 are formed, the clamping bosses 113 may be arranged along the periphery of the supporting member 101 or adjacent and around the opening 111 to effectively reinforce the supporting member 101.

According to an embodiment of the present disclosure, the clamping boss 113 disposed around the opening 111 may be positioned at a central portion in a length or width direction of the supporting member 101, and when the opening 111 is positioned at a central portion in the length or width direction of the supporting member 101, the clamping boss 113 may be disposed adjacent to the opening 111. Various numbers or positions of the clamping bosses 113 may be based on the size and shape of the supporting member 101 or the position of the opening 111.

According to an embodiment of the present disclosure, the supporting member 101 may include supporting protrusions 115 protruding from a side surface thereof. The supporting protrusions 115 may be supported by the inside surface (or internal wall) of the case member 102 to prevent deformation of the case member 102. For example, the supporting protrusions 115 may prevent the case member 102 from deforming against the external force applied to the case member 102. The supporting protrusions 115 are described below with reference to FIG. 8.

According to an embodiment of the present disclosure, the case member 102 may form the outer appearance of the electronic device 100, e.g., the rear surface and/or side surface of the electronic device 100, and the case member 102 may be disposed to surround, at least, the side surface of the supporting member 101. According to an embodiment of the present disclosure, the case member 102 may include a rear surface portion 102a facing another surface (e.g., the rear surface) of the supporting member 101 and a first side wall 102b extending from the rear surface portion 102a and disposed to surround the side surface of the supporting member 101. When the supporting member 101 is coupled, a space may be formed which is surrounded by the supporting member 101, the rear surface portion 102a, and the first side wall 102b. The above-described battery 141 or other electronic parts may be accommodated in the space. The first side wall 102b may form an overall side surface of the electronic device 100 and may have a plurality of through-holes 127. The through-holes 127 may provide a space for placement of a power key or volume key (e.g., the key 25b of the above-described input device 25), an interface (e.g., the above-described interface 27) or an earphone connector (which may provide an interface between the above-described audio module 28 and the earphone 28c), and a path connecting to sockets for various storage media (e.g., the above-described external memory 23b).

According to an embodiment of the present disclosure, one or more supporting pieces 129 may be formed at each of both ends of the case member 102 in the length direction thereof. The supporting pieces 129 may be shaped to extend from the end of the first side wall 102b to the inside of the case member 102. The supporting pieces 129 may attach to a portion (e.g., an edge of an upper end and/or lower end) of the front cover 103 to support and fasten the front cover 103.

According to an embodiment of the present disclosure, the front cover 103 may be attached or fixed to a surface of the supporting member 101, and the front cover 103 and the case member 102 may form the outer appearance of the electronic device 100. When the front cover 103 is attached and fastened to the supporting member 101, the case member 102 may be disposed to surround the front cover 103 around the periphery of the front cover 103. According to an embodiment of the present disclosure, a portion of an upper end and/or lower end of the front cover 103 may be attached and fixed to the supporting pieces 129. For example, the front cover 103 may be surrounded by an upper end of the first side wall 102b, and at least one of both ends of the front cover 103 in the length direction thereof may be attached and fixed to the supporting pieces 129.

According to an embodiment of the present disclosure, the front cover 103 may form a display device of the electronic device 100. For example, the front cover 103 may include the display panel 103b that is attached to the supporting member 101 and a window member 103a that is attached to face the display panel 103b. The window member 103a may transmit images or videos generated from the display panel 103b and protect the display panel 103b from external environments. The window member 103a may include a screen transmissive area VA corresponding to the display panel 103b and printed areas BM1 and BM2 provided at a side of the screen transmissive area VA and/or other side thereof. The first and second printed areas BM1 and BM2 may expose an input device, such as a touch key, a receiving part (e.g., the above-described receiver 28b) for a voice call, an aperture for capturing images, or a proximity/illumination sensor (e.g., the above-described proximity sensor 24a and the illumination sensor 24b). In one example, the first and second printed areas BM1 and BM2 are provided at opposing ends, e.g., the upper end and lower end, in the length direction of the electronic device 100.

Figure 3:
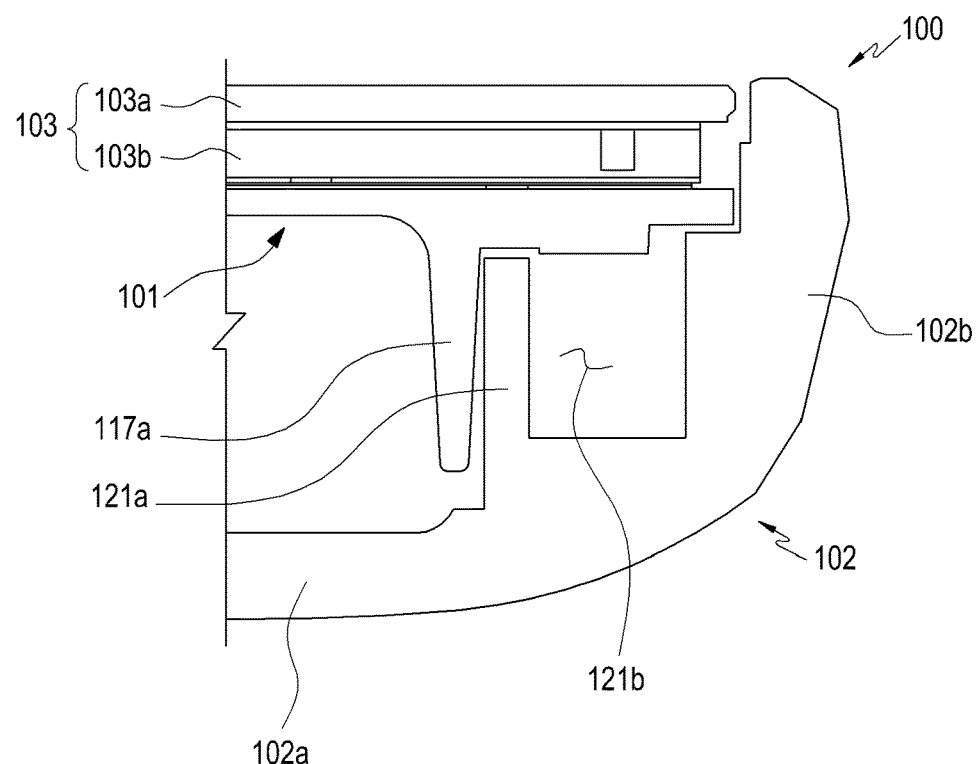
FIG. 3 is a cross-sectional view illustrating a portion of an electronic device according to an embodiment of the present disclosure.
Figure 4:
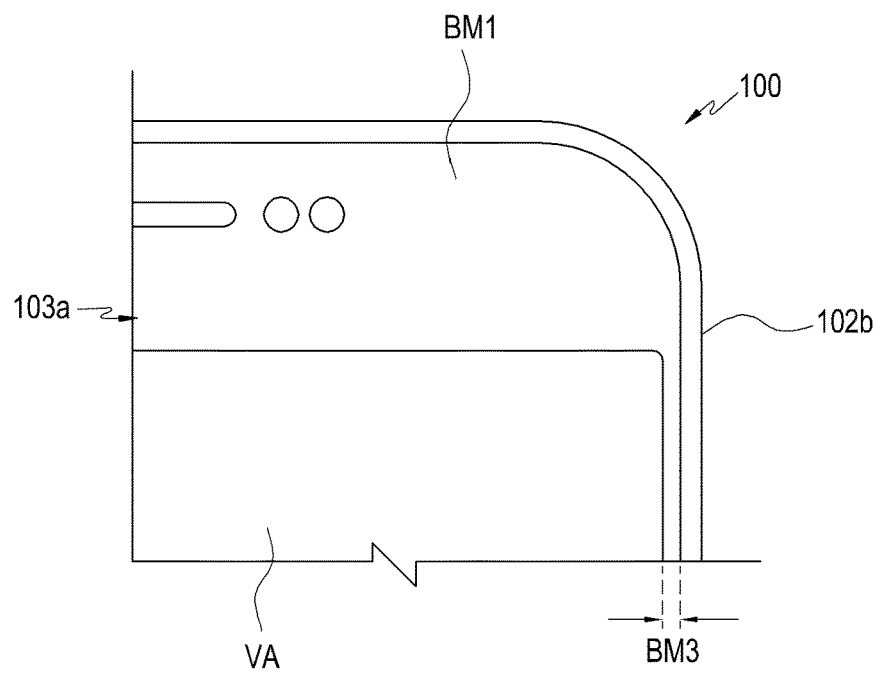
FIG. 4 is an expanded view illustrating an electronic device according to an embodiment of the present disclosure.

FIG. 3 is a cross-sectional view illustrating a portion of an electronic device according to an embodiment of the present disclosure. FIG. 4 is an expanded view illustrating an electronic device according to an embodiment of the present disclosure.

Referring to FIG. 3, the electronic device 100 may include a second side wall 121a formed in the case member 102 and one or more first coupling members 117a that are formed in the supporting member 101. The second side wall 121a protrudes from the rear surface portion 102a and faces the first side wall 102b. The second side wall 121a may be shaped to extend along the periphery of the rear surface portion 102a. A slot 121b may be formed between the first side wall 102b and the second side wall 121a. The first coupling members 117a may be shaped as a rib that extend from the other surface of the supporting member 101 and at least partially extend along the periphery of the supporting member 101. According to an embodiment of the present disclosure, the first coupling members 117a may be arranged along the periphery of the supporting member 101. When the supporting member 101 is coupled with the case member 102, the first coupling members 117a may be supported by the inside surface of the second side wall 121a to fix the supporting member 101 to the case member 102.

According to an embodiment of the present disclosure, when the supporting member 101 is coupled and fixed to the case member 102, the interval between the periphery of the supporting member 101 and the internal wall (e.g., the inside surface of the first side wall 102b) of the case member 102 may be smaller than the interval between the front cover 103 and the internal wall of the case member 102 (e.g., the inside surface of the first side wall 102b). For example, when an external force is applied to case member 102, the front cover 103, may be protected from the external force.

FIG. 3 shows a cross section of an edge of the electronic device 100 and the case member 102 in a length direction thereof and illustrates an example in which the window member 103a further extends to an outside (e.g., to the right in FIG. 3) than the display panel 103b does.

Referring to FIG. 4, a third printed area BM3 may be formed on a portion of the window member 103a that extends over the display panel 103b. Referring back to FIG. 3, the internal area of the window member 103a corresponding to the third printed area BM3 may be provided as an empty space. For example, the window member 103a is not attached to, e.g., the case member 102 in either or both of the edges in the length direction of the electronic device 100 or the case member 102, leaving the empty space therein. The empty space may be utilized to allow for placement of an enlarged display panel. For example, the display panel 103b and the window member 103a may have the same width, forming the front cover 103. In such case, the third printed area BM3 may be omitted.

Figure 5:
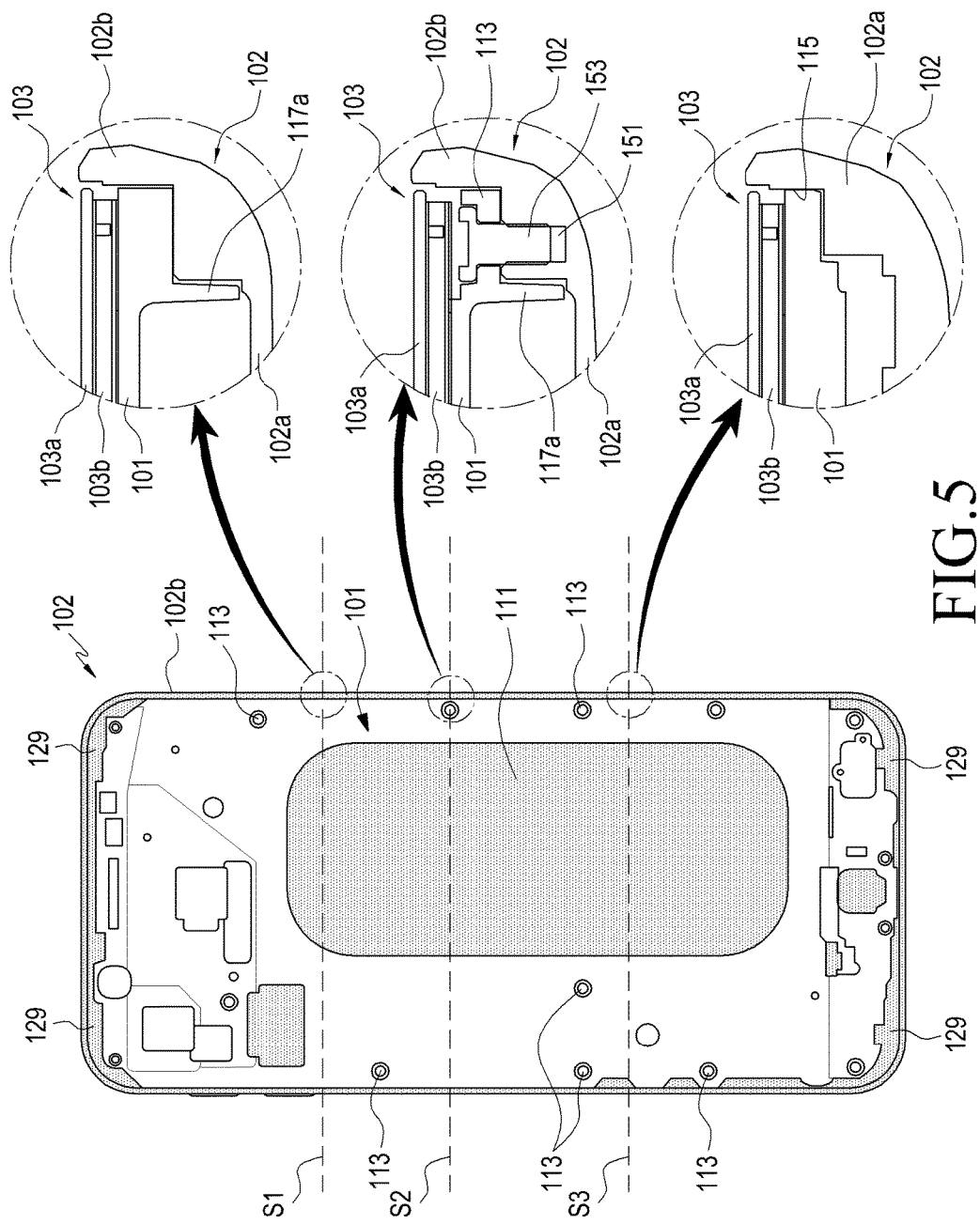
FIG. 5 is a view illustrating a supporting member coupled with a case member according to an embodiment of the present disclosure.

FIG. 5 is a view illustrating a supporting member coupled with a case member according to an embodiment of the present disclosure.

Referring to FIG. 5, when the supporting member 101 is coupled with the case member 102, the supporting pieces 129 may protrude to a front surface of the supporting member 101 or the case member 102. A portion of each of the above-described printed areas BM1 and BM2 may be positioned corresponding to one of the supporting pieces 129. For example, the supporting pieces 129 may be positioned facing the printed areas BM1 and BM2 and may be smaller in area than the printed areas BM1 and BM2. When the front cover 103 is attached and fixed to the supporting member 101, the supporting member 101 and the supporting pieces 129 may be hidden, and the first side wall 102b may be viewed along the periphery of the front cover 103. The clamping bosses 113 may be arranged along the periphery of the supporting member 101 in a lengthwise and/or widthwise central portion of the supporting member 101. According to an embodiment of the present disclosure, the number and the position of the clamping bosses 113 may vary depending on the size and shape of the supporting member 101 and the size and shape of the opening 111.

Referring to FIG. 5, dotted line S1 is positioned on a section where the first coupling member 117a is formed, dotted line S2 is positioned on a section where the clamping boss 113 is formed, and dotted line S3 is positioned on a section where the supporting protrusion 115 is formed. FIG. 5 further illustrates the respective cross sections of edge portions of the electronic device along the dotted lines S1 to S3. The first coupling member 117a, the clamping boss 113, and/or the supporting protrusion 115 may be positioned independently or adjacent to each other in the direction of the width of the supporting member 101. For example, the first coupling member 117a may be disposed in the section including the dotted line S1, but the clamping boss 113 and the supporting protrusion 115 are not. The first coupling member 117a and the clamping boss 113 may together be arranged in the section including the dotted line S2. The supporting protrusion 115 may be disposed in the section including the dotted line S3, but the clamping boss 113 and the first coupling member 117a are not.

According to an embodiment of the present disclosure, the first coupling member 117a, the clamping boss 113, and the supporting protrusion 115 may be disposed in some section. None of the first coupling member 117a, the clamping boss 113, and the supporting protrusion 115 may be disposed in another section. The clamping boss 113 and the supporting protrusion 115 may be disposed in some section, and the first coupling member 117a and the supporting protrusion 115 may be disposed in the other section. For example, the first coupling member 117a, the clamping boss 113, and/or the supporting protrusion 115 may be disposed independent or adjacent to each other, and various ways or types of displacement or positioning may be implemented based on the arrangement or mechanical stiffness of internal parts of the electronic device 100.

According to an embodiment of the present disclosure, a coupling member (or attaching member) 153 may be inserted in the clamping boss 113. The case member 102 may include a coupling hole 151 corresponding to the coupling member 153. The coupling member 153 may include, e.g., a screw, rivet, or fusion member. For example, the supporting member 101 may be attached and fixed to the case member 102 by screwing into the coupling hole 151, press-fittingly coupling into the coupling hole 151, or thermally or ultrasonically welding a fusion member that is put in the clamping boss 113 and the coupling hole 151.

Figure 6:
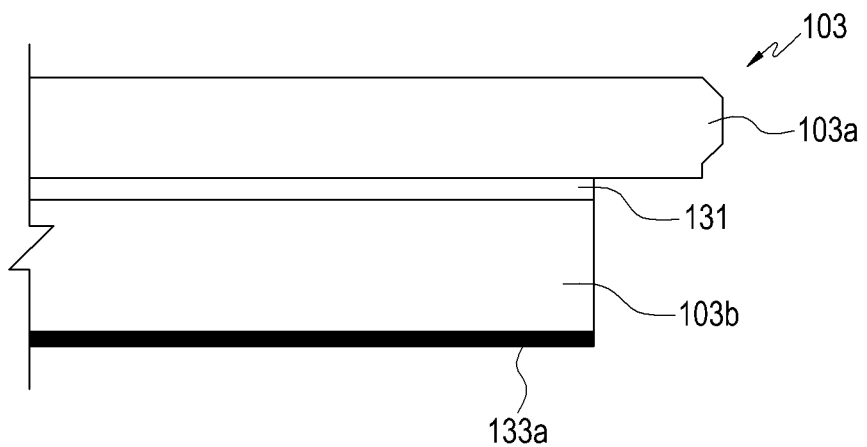
FIG. 6 is a side view illustrating a front cover of an electronic device according to an embodiment of the present disclosure.
Figure 7:
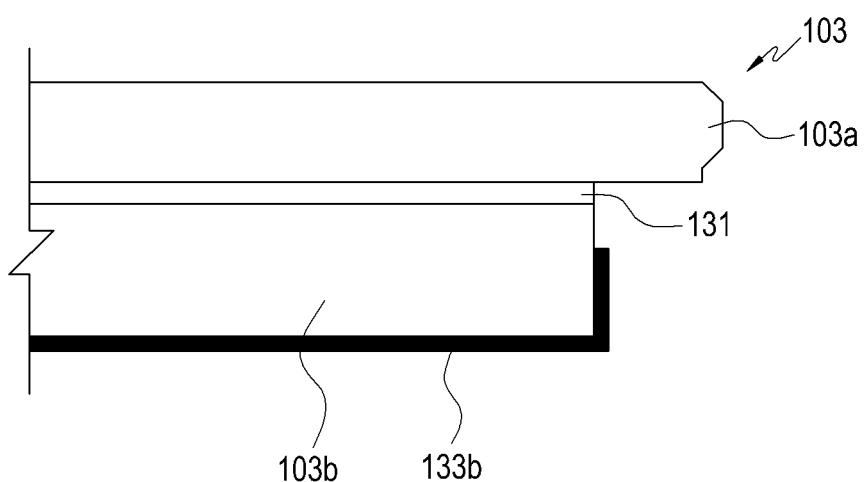
FIG. 7 is a side view illustrating a front cover of an electronic device according to an embodiment of the present disclosure.

FIG. 6 is a side view illustrating a front cover of an electronic device according to an embodiment of the present disclosure. FIG. 7 is a side view illustrating another example of a front cover of the electronic device according to an embodiment of the present disclosure.

Referring to FIGS. 6 and 7, according to an embodiment of the present disclosure, the front cover 103 may further include a touch panel 131 (e.g., the touch panel 25a of the above-described input device 25) that is interposed between the window member 103a and the display panel 103b. The touch panel 131 may be disposed in an inside surface of the window member 103a or an external surface of the display panel 103b in an integrated form, and the touch panel 131, in combination with the display panel 103b, may implement a touchscreen functionality. According to an embodiment of the present disclosure, the electronic device 100 may further include shock-absorbing members 133a and 133b interposed between the display panel 103b and the supporting member 101. The shock-absorbing members 133a and 133b may absorb impacts transferred through the supporting member 101 to protect the display panel 103b. Upon attaching the display panel 103b to the supporting member 101, a separate attaching member may be provided. However, the shock-absorbing members 133a and 133b may be formed of double-sided adhesive tapes, thereby allowing the display panel 103b to be attached to the supporting member 101. The shock-absorbing members 133a and 133b may be attached to an overall inside surface of the display panel 103b as shown in FIG. 6 or may be attached to at least a portion of the inside surface and side wall of the display panel 103b as shown in FIG. 7.

Figure 8:
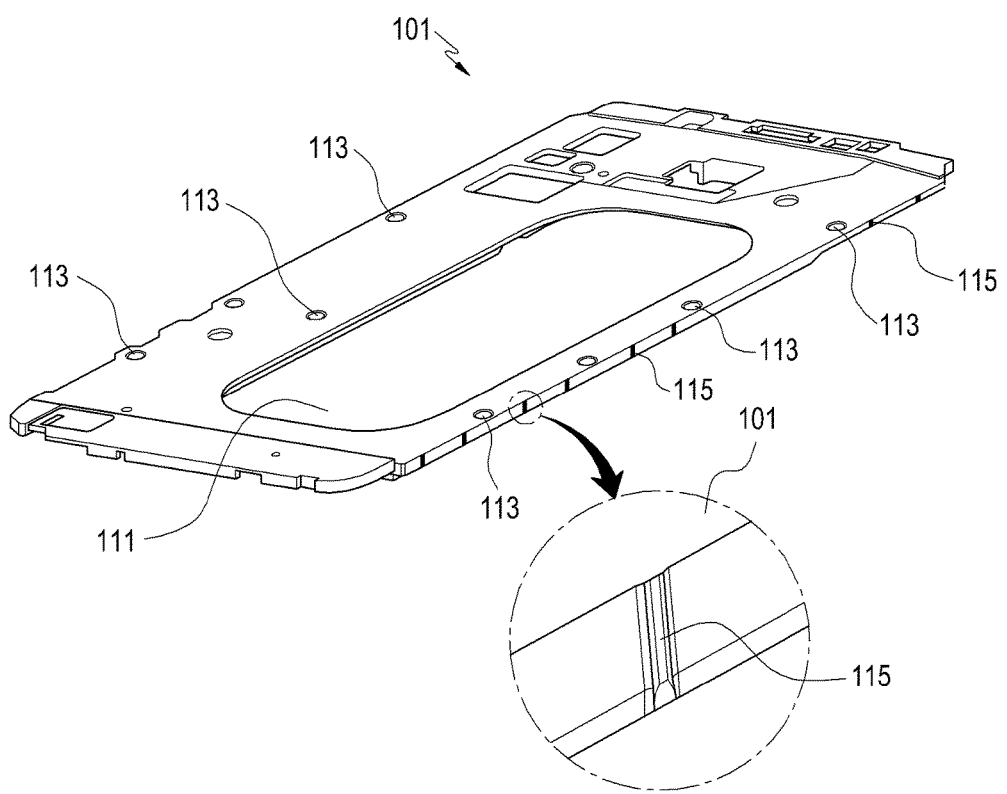
FIG. 8 is a perspective view illustrating a supporting member of an electronic device according to an embodiment of the present disclosure.
Figure 9:
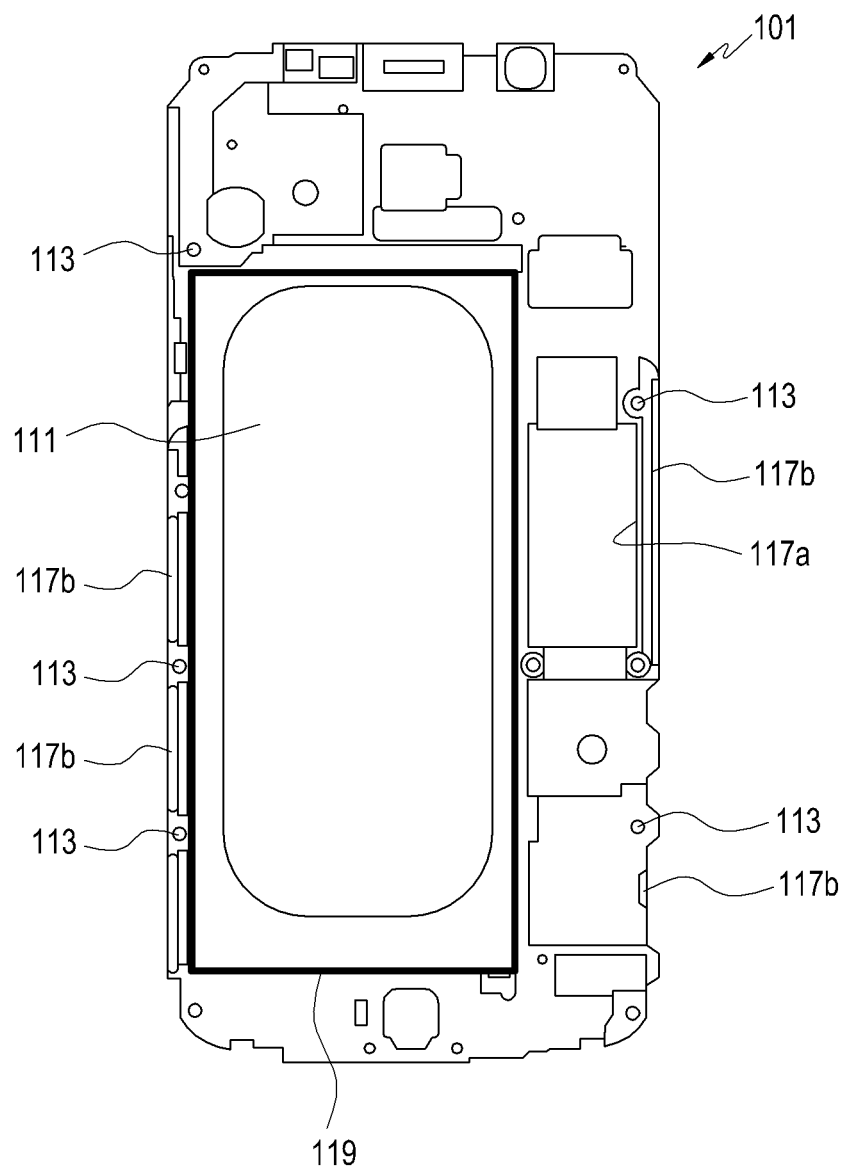
FIG. 9 is a plan view illustrating a supporting member of an electronic device according to an embodiment of the present disclosure.

FIG. 8 is a perspective view illustrating a supporting member of an electronic device according to an embodiment of the present disclosure. FIG. 9 is a plan view illustrating a supporting member of an electronic device according to an embodiment of the present disclosure.

Referring to FIGS. 8 and 9, the supporting member 101 may include the supporting protrusions 115, the first coupling members 117a, and second coupling members 117b.

According to an embodiment of the present disclosure, an area corresponding to the battery 141 may be disposed in the other surface of the supporting member 101 (e.g., a surface facing the rear surface portion 102a of the case member 102). A rib-shaped fence 119 may be formed along the periphery of the area corresponding to the battery 141 to set a position where the battery 141 is to be mounted. The area corresponding to the battery 141 may be set to be larger in area than the opening 111. For example, the opening 111 may be positioned inside the area corresponding to the battery 141. According to an embodiment of the present disclosure, a portion of the fence 119 setting the position where the battery 141 is to be mounted may be utilized as the first coupling member 117a.

According to an embodiment of the present disclosure, the supporting protrusion 115 may protrude from a side surface of the supporting member 101 and extend in the direction of the width of the supporting member 101. The supporting protrusion 115 may protrude from the side surface of the supporting member 101, e.g., at a height of 0.05 mm. The height at which the supporting protrusion 115 protrudes from the side surface of the supporting member 101 may be set to have various values based on the coupling force or structure between the supporting member 101 and the case member 102. Although formed on the same side surface of the supporting member 101, the supporting protrusions 115 may have different heights. According to an embodiment of the present disclosure, multiple supporting protrusions 115 may be formed along an overall edge of the supporting member 101 or formed on both lengthwise side surfaces of the supporting member 101 spaced apart from each other at a proper interval. When the supporting member 101 is coupled with the case member 102, the supporting protrusions 115 may be brought in contact and supported by an internal wall of the case member 102, e.g., the internal wall of the first side wall 102b.

According to an embodiment of the present disclosure, the first and second coupling members 117a and 117b may protrude from another surface of the supporting member 101. The first and second coupling members 117a and 117b may face each other and may extend in parallel with each other along the periphery of the supporting member 101. According to an embodiment of the present disclosure, one of the first and second coupling members 117a and 117b may be formed in some section of the periphery of the supporting member 101. The first and second coupling members 117a and 117b may be disposed corresponding to the first and second side walls 102b and 121a, respectively. When the first and second coupling members 117a and 117b are formed, supporting protrusions 115 may be formed on an outside surface of the second coupling member 117b.

According to an embodiment of the present disclosure, the structure of a coupling between the supporting member 101 and the case member 102 via the supporting protrusions 115 and the first and second coupling members 117a and 117b is described in greater detail with reference to FIGS. 10 to 13.

Figure 10:
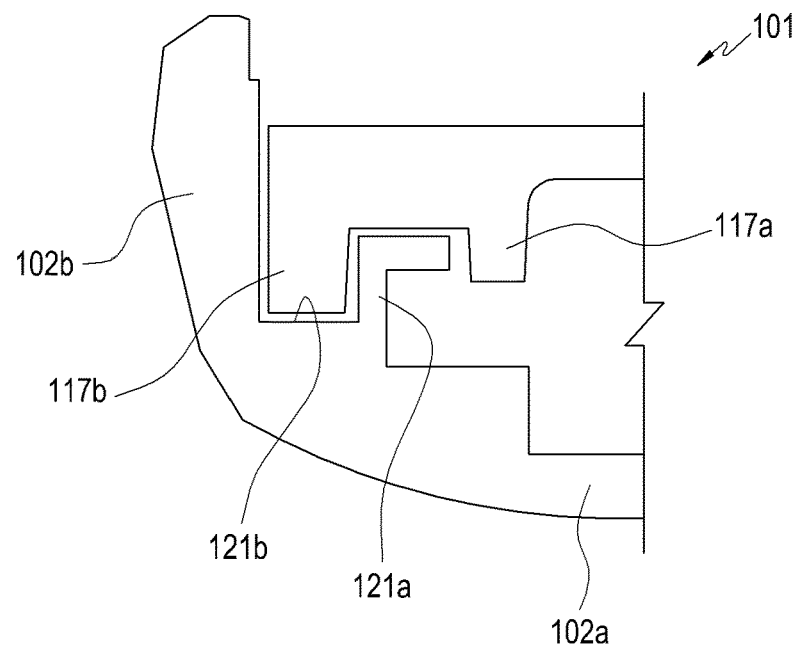
FIG. 10 is a cross-sectional view illustrating a supporting member coupled with a case member according to an embodiment of the present disclosure.
Figure 11:
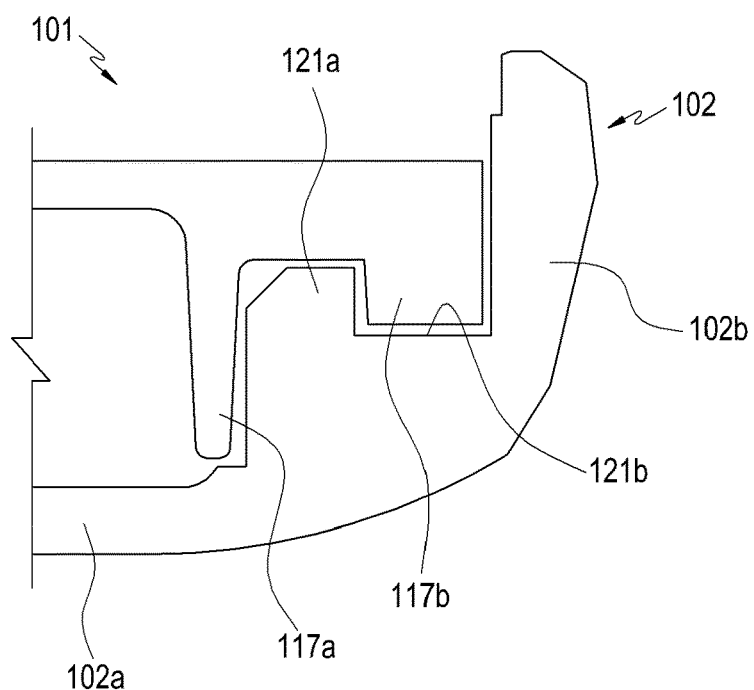
FIG. 11 is a cross-sectional view illustrating a supporting member coupled with a case member according to an embodiment of the present disclosure.
Figure 12:
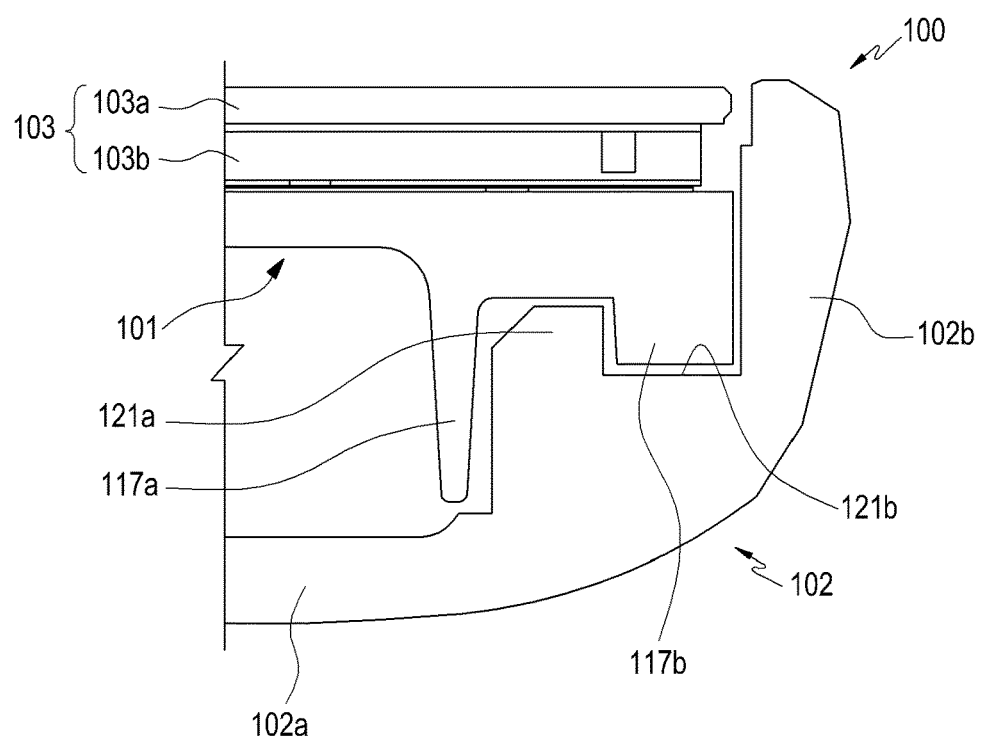
FIGS. 12 and 13 are views illustrating supporting protrusions of an electronic device according to an embodiment of the present disclosure.
Figure 13:
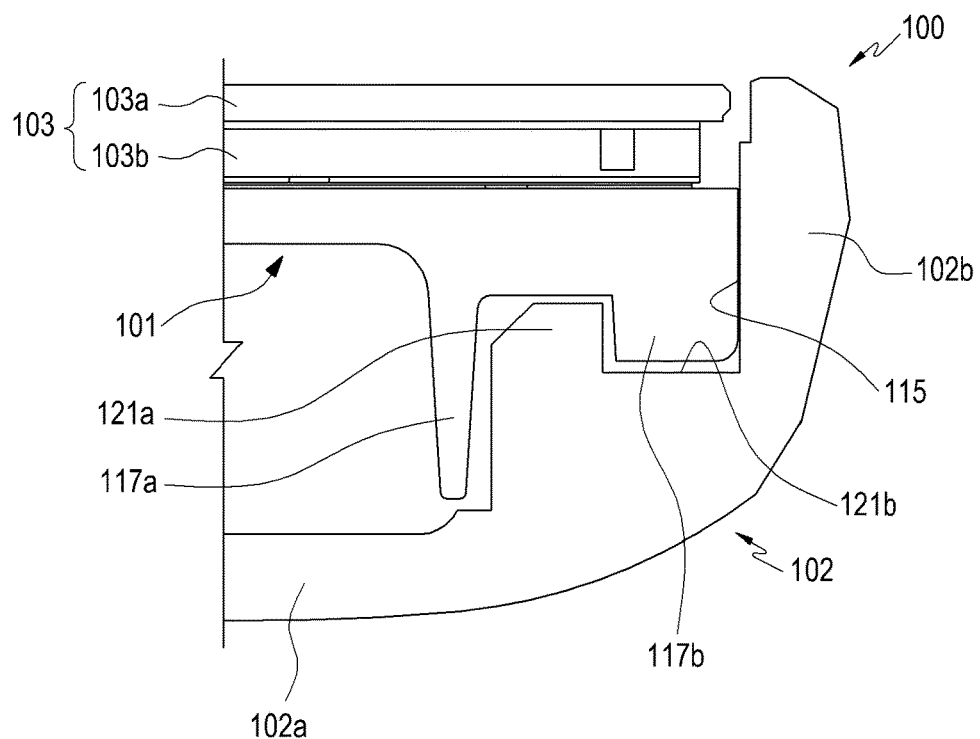

FIG. 10 is a cross-sectional view illustrating a supporting member coupled with a case member according to an embodiment of the present disclosure. FIG. 11 is a cross-sectional view illustrating a supporting member coupled with a case member according to an embodiment of the present disclosure. FIGS. 12 and 13 are views illustrating supporting protrusions of an electronic device according to an embodiment of the present disclosure.

Referring to FIGS. 10 and 11, according to an embodiment of the present disclosure, when the supporting member 101 is coupled with the case member 102, the first coupling member 117a may be positioned opposite an inside surface of the second side wall 121a. The second coupling member 117b may be formed on the periphery of the supporting member 101 and may be positioned opposite an outside surface of the second side wall 121a. For example, the second coupling member 117b may be received in the slot 121b that is disposed between the first and second side walls 102b and 121a, and the second side wall 121a may be received between the first and second coupling members 117a and 117b.

According to an embodiment of the present disclosure, the second coupling member 117b may be press-fittingly received between the first and second side walls 102b and 121a, and the second side wall 121a may be press-fittingly received between the first and second coupling members 117a and 117b. The second coupling member 117b may support the first side wall 102b while coupled between the first and second side walls 102b and 121a. For example, the second coupling member 117b may suppress the deformation of the first side wall 102b against an external force applied to the first side wall 102b. Further, upon coupling the supporting member 101 with the case member 102, the first and second side walls 102b and 121a may be engaged with the first and second coupling members 117a and 117b, thereby improving the overall stiffness of the electronic device 100. For example, the structures which are alternately engaged between the supporting member 101 and the case member 102 may enhance the stiffness against the bending force or the twisting force that is applied to the electronic device 100.

According to an embodiment of the present disclosure, although the first and second side walls 102b and 121a or the first and second coupling members 117a and 117b are schematically shown in the drawings, the present disclosure is not limited to the shapes. For example, various shapes, numbers, or positions of the first and second side walls 102*b* and 121*a* or first and second coupling members 117*a* and 117*b* may be provided considering the arrangement of electronic parts in the internal space of the electronic device 100, the stiffness of the electronic device 100 against external force, and the number or position of the clamping bosses 113.

Referring to FIGS. 12 and 13, according to an embodiment of the present disclosure, the coupled state of the supporting member 101 and the case member 102 may differ between a portion where the supporting protrusions 115 are formed and a portion where the supporting protrusions 115 are omitted. For example, as shown in FIG. 12, in the portion where supporting protrusions 115 are not formed, the side surface of the supporting member 101 or outside surface of the second coupling member 117*b* may remain spaced from the first side wall 102*b*. However, the supporting protrusions 115 may be supported by the inside wall of the first side wall 102*b*.

According to an embodiment of the present disclosure, when an external force is applied to the case member 102, e.g., the first side wall 102*b*, the first side wall 102*b* may be deformed to the inside to push or impact the window member 103*a*. The supporting protrusions 115 may support the first side wall 102*b* to prevent deformation of the first side wall 102*b*. For example, the supporting protrusions 115 may suppress deformation of the first side wall 102*b*, preventing application of an external force to the front cover 103 or the window member 103*a*. According to an embodiment of the present disclosure, the supporting protrusions 115 may leave the case member 102 spaced apart from the periphery of the front cover 103, e.g., the periphery of the window member 103*a*.

According to an embodiment of the present disclosure, the interval between the periphery of the supporting member 101 or the supporting protrusion 115 and the first side wall 102*b* may be smaller than the interval between the inside wall of the first side wall 102*b* and the front cover 103 (e.g., the window member 103*a*). Such design and/or arrangement may allow the supporting member 101 or the supporting protrusions 115 to suppress or prevent deformation of the first side wall 102*b* when a force is applied to deform the first side wall 102*b* to the inside and to prevent the first side wall 102*b* from impacting the front cover 103.

According to an embodiment of the present disclosure, the supporting protrusions 115 are formed in the side surface of the supporting member 101 to allow for easier assembly of the supporting member 101 and the case member 102. For example, upon coupling the second coupling member 117*b* to any device positioned between the first and second side walls 102*b* and 121*a*, the overall side surface of the supporting member 101 may be prevented from rubbing against the inside wall of the first side wall 102*b*. Accordingly, the second coupling member 117*b* may be subject to small frictional resistance when entering the space between the first and second side walls 102*b* and 121*a*, and the supporting protrusions 115 may stably support the first side wall 102*b* when the second coupling member 117*b* has fully entered the space between the first and second side walls 102*b* and 121*a*.

According to an embodiment of the present disclosure, while the supporting member 101 remains coupled with the case member 102, the supporting member 101 may be fixed to the case member 102 by coupling of the coupling member, e.g., a screw, through the clamping bosses 113. As the supporting member 101 is fixed facing the rear surface of the case member 102 by the coupling member, the second coupling member 117*b* may further stably be fixed between the first and second side walls 102*b* and 121*a*. For example, it may be possible to enhance the stiffness of the first side wall 102*b* or the structural stability of the electronic device 100 against a bending force or a twisting force.

Figure 14:
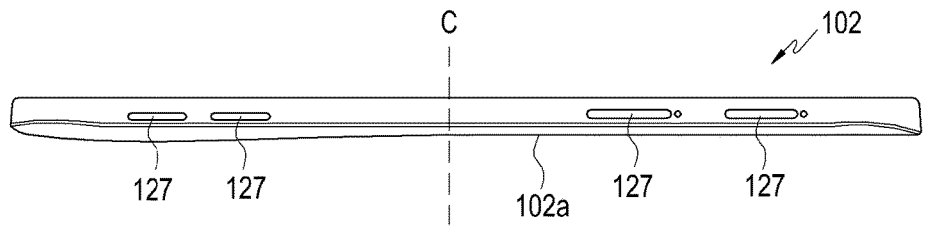
FIG. 14 is a side view illustrating a case member of an electronic device according to an embodiment of the present disclosure.
Figure 15:
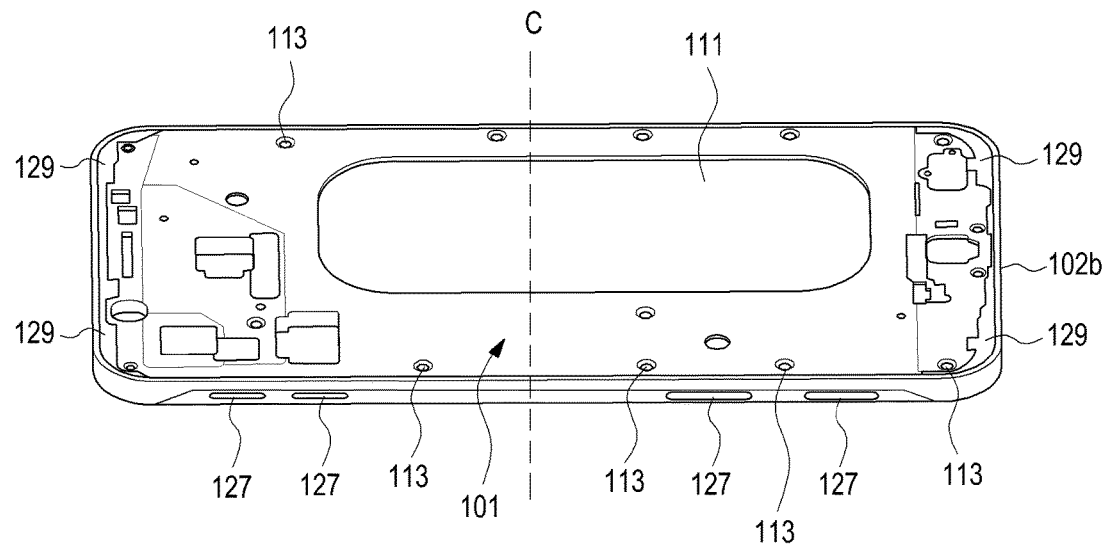
FIG. 15 is a perspective view illustrating a supporting member coupled with a case member according to an embodiment of the present disclosure.

FIG. 14 is a side view illustrating a case member of an electronic device according to an embodiment of the present disclosure. FIG. 15 is a perspective view illustrating a supporting member coupled with a case member according to an embodiment of the present disclosure.

Referring to FIGS. 14 and 15, the above-described through-holes 127 may be arranged in a side surface of the case member 102, e.g., the first side wall 102*b*. A plurality of through-holes 127 may be arranged in one side surface, which may reduce the stiffness of the case member 102. For example, the case member 102 may be deformed by a force applied to the central portion of the case member 102. According to an embodiment of the present disclosure, in the electronic device (e.g., the above-described electronic device 100), the through-holes 127 may be formed at a position spaced apart from the central portion C of the case member 102 by arranging multiple through-holes 127 in a single side surface of the case member 102, thereby maintaining the stiffness of the case member 102. For example, some of the through-holes 127 may properly be distributed and arranged between the central portion C and an end (e.g., a lengthwise upper end) of the case member 102 or between the central portion C of the case member 102 and the other end thereof (e.g., a lengthwise lower end).

According to an embodiment of the present disclosure, the above-described clamping bosses 113 and the first and second coupling members 117*a* and 117*b* are arranged adjacent to the through-holes 127, thereby compensating for decreased stiffness due to the through-holes 127. According to an embodiment of the present disclosure, the through-holes 127 may provide a space for installation of the power key or volume keys or an insertion path for various connectors or storage medium, and the first and second coupling members 117*a* and 117*b* may be arranged alternately with the through-holes 127. At least some of the clamping bosses 113 may be arranged alternately with the through-holes 127. For example, it may be possible to prevent the installation space for various keys or the insertion path for storage medium from interfering with the clamping bosses 113 or the first and second coupling members 117*a* and 117*b* while compensating for reduced stiffness due to the through-holes 127.

Figure 16:
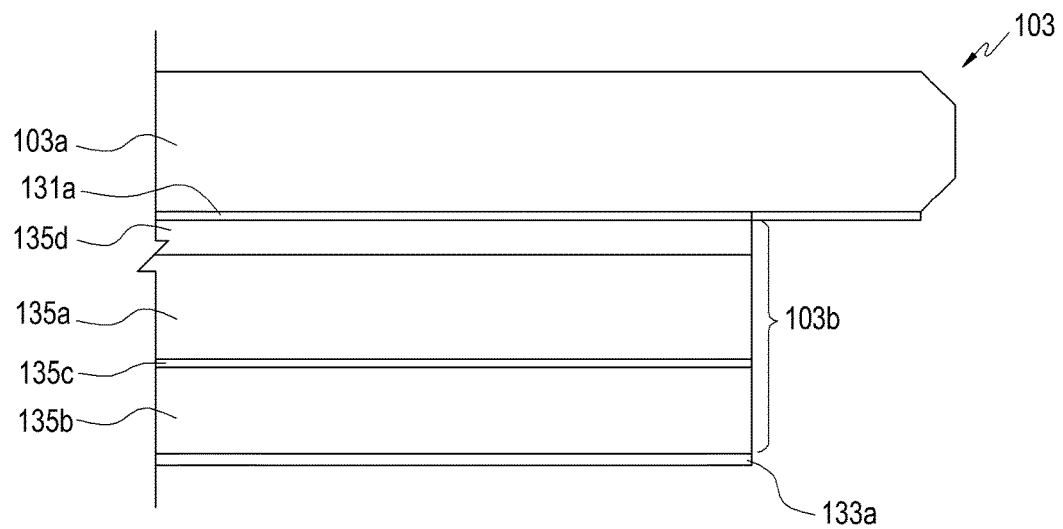
FIG. 16 is a cross-sectional view illustrating a configuration of a front cover of an electronic device according to an embodiment of the present disclosure.
Figure 17:
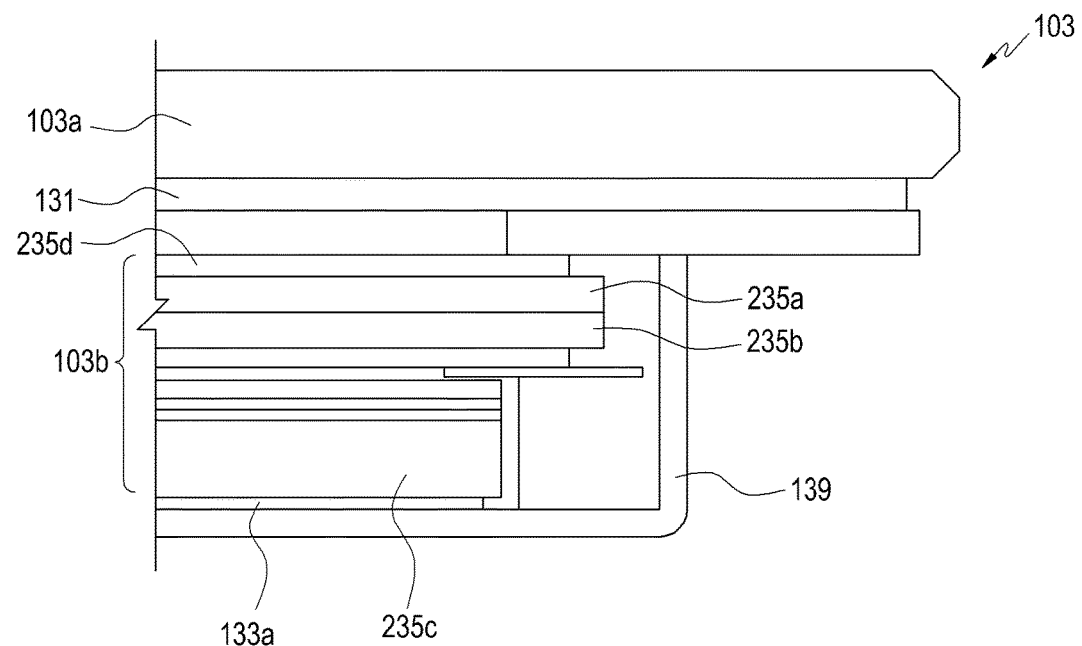
FIG. 17 is a cross-sectional view illustrating a configuration of a front cover of an electronic device according to an embodiment of the present disclosure.

FIG. 16 is a cross-sectional view illustrating a configuration of a front cover of an electronic device according to an embodiment of the present disclosure. FIG. 17 is a cross-sectional view illustrating a configuration of a front cover of an electronic device according to an embodiment of the present disclosure.

Referring to FIG. 16, the front cover may include the display panel 103*b* disposed in an inside surface of the window member 103*a*. The display panel 103*b* may include a light emission layer (not shown) and an upper panel 135*a* and lower panel 135*b* facing each other with the light emission layer disposed therebetween. For example, a sealing layer 135*c* may be formed along the periphery with the upper panel 135*a* facing the lower panel 135*b*. The light emission layer may be disposed in a space surrounded by the upper panel 135*a*, the lower panel 135*b*, and the sealing layer 135*c*. According to an embodiment of the present disclosure, the display panel 103*b* may further include a polarization plate 135d. The polarization plate 135d may be disposed on the upper panel 135a to face the window member 103a. According to an embodiment of the present disclosure, the above-described touch panel 131 and an adhesive layer 131a may be disposed between the polarization plate 135d and the window member 103a.

Referring to FIG. 17, the display panel 103b may be attached to the window member 103a, while being received in a shield member 139. The display panel 103b may include an upper panel 235a and a lower panel 235b facing each other, with a liquid crystal layer (not shown) disposed therebetween. A polarization plate 235d may be disposed on the upper panel 235a to face the window member 103a and the touch panel 131. The shield member 139 may be formed of a metallic material. A shock-absorbing member 133a may be disposed between the display panel 103b and the shield member 139 to prevent transfer of force from the shield member 139 to the display panel 103b.

When the liquid crystal layer of the display panel 103b fails to emit light, the display panel 103b may further include an illumination device 235c. The illumination device 235c may include a plurality of light sources dispersed in the entire area of the lower panel 235b and the display panel 103b and may evenly provide illumination to the display panel 103b. According to an embodiment of the present disclosure, the illumination device 235c may include a light dispersing sheet disposed opposite the lower panel 235b and at least one light source disposed or arrayed along the periphery of the display panel 103b. For example, the light sources disposed or arrayed along the periphery of the display panel 103b may emit light to the light dispersing sheet that may then disperse or emit illumination to the overall area of the display panel 103b.

Figure 18:
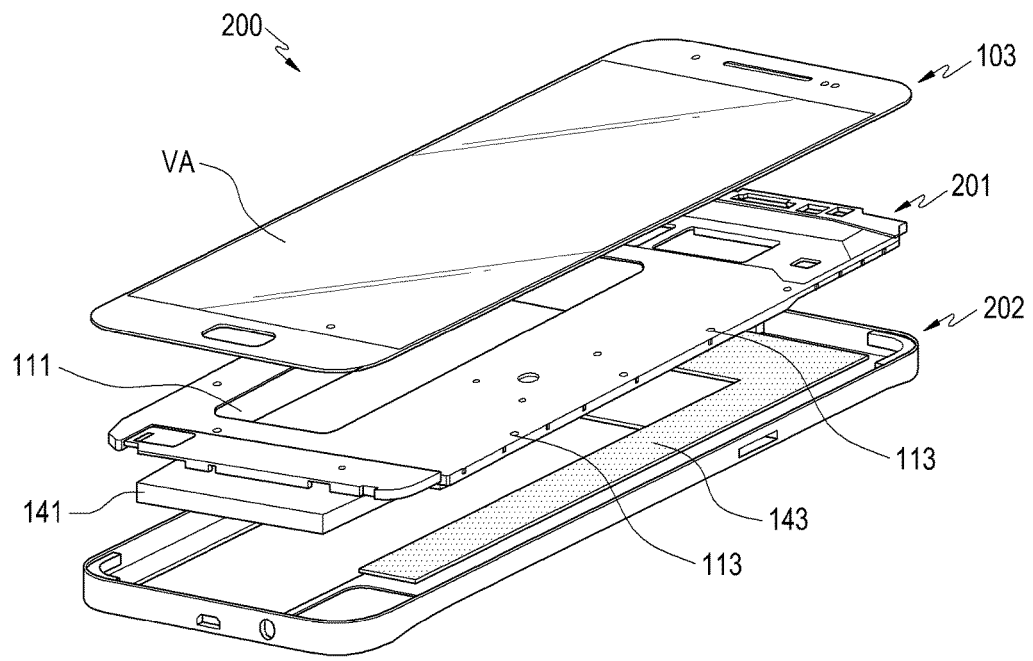
FIG. 18 is an exploded perspective view illustrating an electronic device according to an embodiment of the present disclosure.
Figure 19:
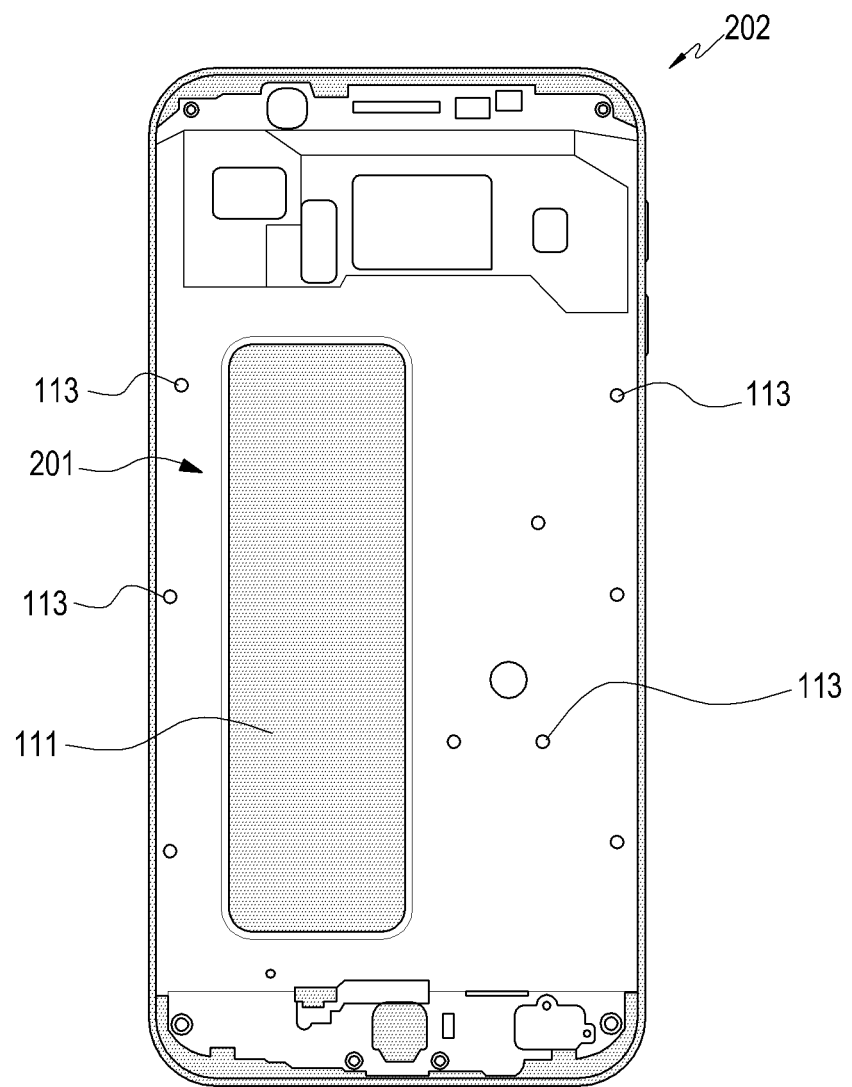
FIG. 19 is a view illustrating a supporting member coupled with a case member according to an embodiment of the present disclosure.
Figure 20:
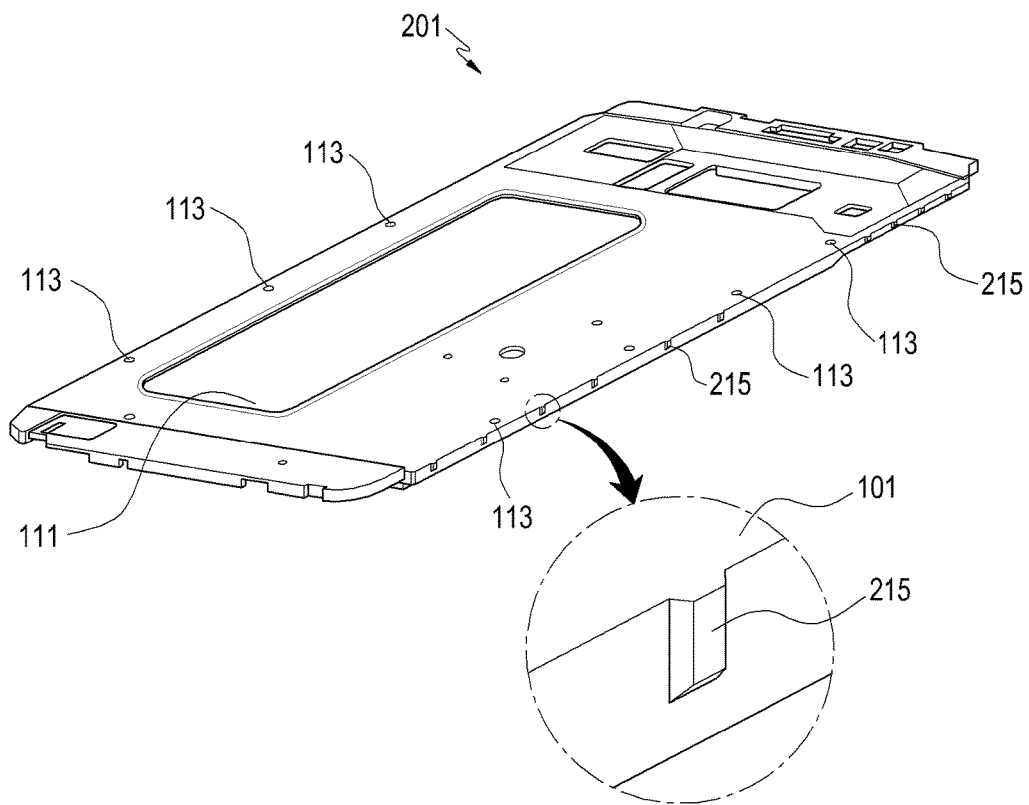
FIG. 20 is a perspective view illustrating a supporting member of an electronic device according to an embodiment of the present disclosure.

FIG. 18 is an exploded perspective view illustrating an electronic device according to an embodiment of the present disclosure. FIG. 19 is a view illustrating a supporting member coupled with a case member according to an embodiment of the present disclosure. FIG. 20 is a perspective view illustrating a supporting member of an electronic device according to an embodiment of the present disclosure.

It should be noted that an electronic device according to an embodiment of the present disclosure may be different in shape or arrangement of the components thereof from that of the above embodiments, and the same components as those in the above embodiments may be denoted with the same reference numbers or may be omitted from assignment of reference numbers and no further detailed description thereof is given.

Referring to FIGS. 18 to 20, an electronic device 200 may include a supporting member 201, a case member 202, and the front cover 103. The supporting member 201 may be coupled into an inside of the case member 202, and a predetermined size of space may be formed between a portion of the case member 202 and the supporting member 201. The battery 141 or a circuit board 143 may be disposed in the space formed between the portion of the case member 202 and the supporting member 201.

Various electronic parts of the above-described electronic device 20, e.g., the processor 21, the memory 23, the sensor module 24, the input device 25, the interface 27, the audio module 28, or the power management module 29d, may be mounted or connected to the circuit board 143. The circuit board 143 may be shaped to be disposed in an area surrounding the battery 141. The battery 141 is disposed in the space formed between the portion of the case member 202 and the supporting member 201. Although a single circuit board 143 is illustrated, the present disclosure is not limited thereto. For example, a plurality of circuit boards may be arranged in the space formed between the portion of the case member 202 and the supporting member 201, and the electronic parts may be distributed or jointly arranged in the plurality of circuit boards according to the functions and mutual relation of the electronic parts.

According to an embodiment of the present disclosure, a supporting protrusion 215 formed on a side surface of the supporting member 201 may have an end with a predetermined area, which is positioned along the direction of protrusion from the side surface. For example, the supporting protrusion 215 may contact a larger area of the inside wall of the case member 202. As compared with the supporting protrusion 115 in the above-described embodiments, the supporting protrusion 215 in the instant embodiment may provide a larger coupling force (e.g., frictional force) between the supporting member 201 and the case member 202.

As set forth above, according to an embodiment of the present disclosure, an electronic device may comprise a supporting member having a plurality of supporting protrusions formed along a side surface thereof, a case member coupled with the supporting member to surround, at least, the side surface of the supporting member, and a front cover coupled to a front surface of the case member, surrounded by the case member, and attached to a first surface of the supporting member.

The supporting protrusions may be supported by an inside surface of the communication to couple the supporting member to the case member.

According to an embodiment of the present disclosure, the case member may include a rear surface portion positioned opposite a second surface of the supporting member, the first surface of the supporting member positioned opposite the second surface of the supporting member, and a first side wall extending from the rear surface portion and disposed to surround the side surface of the supporting member, and an end of the first side wall may be positioned in a periphery of the front cover.

According to an embodiment of the present disclosure, the electronic device may further comprise a second side wall extending from the rear surface portion and facing an inside surface of the first side wall and a first coupling member extending from the second surface of the supporting member and having the supporting protrusions formed on an outside surface thereof, wherein the first coupling member may be coupled between the first side wall and the second side wall.

According to an embodiment of the present disclosure, the electronic device may comprise a second coupling member protruding from the second surface of the supporting member and facing the first coupling member, wherein the second side wall may be coupled between the first coupling member and the second coupling member.

According to an embodiment of the present disclosure, the front cover may include a window member positioned in a front surface of the case member and a display panel disposed in an inside surface of the window member, wherein the display panel may be attached to the first surface of the supporting member.

According to an embodiment of the present disclosure, the electronic device may further comprise a shock-absorbing member disposed between the display panel and the supporting member, wherein the shock-absorbing member may include a double-sided adhesive tape attaching the display panel to the supporting member.

According to an embodiment of the present disclosure, the shock-absorbing member may be attached to an overall surface of the display panel and at least a portion of a side wall of the display panel.

According to an embodiment of the present disclosure, the electronic device may further comprise a battery disposed between the case member and the supporting member, an opening formed in at least a portion of an area corresponding to the battery on the supporting member, and at least one clamping boss formed in the supporting member and disposed adjacent to the opening.

According to an embodiment of the present disclosure, the electronic device may further comprise a plurality of through-holes formed to pass from a side surface of the case member through an inside of the case member, wherein the through-holes may be positioned in, at least one side surface of the case member and between a central portion of the case member and a lengthwise end of the case member or between the central portion and another lengthwise end of the case member.

According to an embodiment of the present disclosure, the electronic device may further comprise a plurality of clamping bosses formed along the periphery of the supporting member, wherein at least some of the through-holes and the clamping bosses may be alternately arranged when viewed from a front surface of the case member.

According to an embodiment of the present disclosure, an electronic device may comprise an outer housing including a first plate (e.g., the above-described window member of the front cover), a second plate (e.g., the above-described rear surface portion of the case member) oriented in an opposite direction of the first plate, and a side member (e.g., the above-described first side wall of the case member) at least partially surrounding a space between the first plate and the second plate and a mid-structure (e.g., the above-described supporting member) disposed in the outer housing, including a first surface facing the first plate, a second surface facing the second plate, and a third surface facing at least a portion of the side member, and at least partially surrounded by the side member, wherein at least a portion of a side surface of the first plate may be surrounded by the at least a portion of the side member while spaced apart at a first interval (e.g., the above-described interval between the front cover and the internal wall (e.g., the inside surface of the first side wall) of the case member), wherein at least a portion of the third surface of the mid-structure may be positioned adjacent to at least another portion of the side member while spaced apart from a second interval (e.g., the above-described interval between the periphery of the supporting member and the internal wall (e.g., the inside surface of the first side wall) of the case member), and wherein the second interval may be smaller than the first interval.

According to an embodiment of the present disclosure, the mid-structure may be a plate-shaped structure and may include at least one opening (e.g., the above-described opening) passing through the first surface and the second surface.

According to an embodiment of the present disclosure, the third surface may include at least one protrusion (e.g., the above-described supporting protrusion) projecting to the side member, and a portion or a surface of the protrusion facing the side member may be spaced apart from the side member at the second interval.

According to an embodiment of the present disclosure, the mid-structure may include a long periphery (e.g., the above-described two opposite lengthwise side edges of the supporting member) and a short periphery (e.g., the above-described two opposite lengthwise side edges of the supporting member) as viewed from above the first surface, and wherein the at least one protrusion is disposed on a portion of the longer edge.

According to an embodiment of the present disclosure, the mid-structure may include a through-hole (e.g., the above-described clamping boss) formed adjacent to the side member and to pass through the first surface and the second surface, and the mid-structure may be detachably coupled with the side member by a coupling member (e.g., the above-described coupling member) coupled to the second plate through the through-hole.

According to an embodiment of the present disclosure, the coupling member may include a screw or a rivet.

According to an embodiment of the present disclosure, the electronic device may further comprise a display module (e.g., the above-described display panel) disposed between the mid-structure and the first plate.

According to an embodiment of the present disclosure, the electronic device may further comprise a battery (e.g., the above-described battery) disposed between the mid-structure and at least a portion of the second plate.

According to an embodiment of the present disclosure, the mid-structure may include a metallic material.

According to an embodiment of the present disclosure, the electronic device may further comprise a printed circuit board (e.g., the above-described circuit board) disposed between the mid-structure and at least a portion of the second plate.

While the present disclosure has been shown and described with reference to various embodiments thereof, it will be apparent to those of ordinary skill in the art that various changes in form and detail may be made thereto without departing from the spirit and scope of the present disclosure as defined by the following claims.

For example, the number or position of the supporting protrusions 115 and 215 and/or the area of the end of the supporting protrusions 115 and 215 may be set in various manners considering the assemblability or coupling force of the supporting members 101 and 201 and the case members 102 and 202 or stiffness against the external force applied to the case members 102 and 202.

As is apparent from the foregoing description, according to an embodiment of the present disclosure, in mounting and fastening the front cover including the display panel and the window member, the rear surface of the display panel, may be attached and fixed to the supporting member. Accordingly, the ratio of the screen transmissive area relative to the overall area of the window member may be increased, thus providing a larger screen.

According to an embodiment of the present disclosure, in the electronic device, the overall rear surface of the display panel may be attached to the supporting member, allowing for secure fixture of the front cover, and the case member is disposed to surround the periphery of the front cover to mitigate or prevent damage to the front cover. For example, the front cover may be protected by preventing an external object from interfering with the front cover using the case member.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a supporting member including a first surface, a second surface opposite to the first surface and a plurality of supporting protrusions formed along a side surface thereof;
a case member coupled with the supporting member to surround the side surface of the supporting member and including:
a rear surface portion positioned opposite the second surface of the supporting member,
a first side wall extending from the rear surface portion and disposed to surround the side surface of the supporting member, and
a second side wall extending from the rear surface portion and facing an inside surface of the first side wall;
a first coupling member coupled between the first side wall and the second side wall, wherein the first coupling member extends from the second surface of the supporting member and the plurality of supporting protrusions are formed on an outside surface of the first coupling member;
a second coupling member protruding from the second surface of the supporting member and facing the first coupling member, wherein the second side wall is coupled between the first coupling member and the second coupling member;
a front cover coupled to a front surface of the case member, surrounded by the case member, and attached to the first surface of the supporting member, the front cover includes a window member positioned in the front surface of the case member, and a display panel disposed in an inside surface of the window member; and
a shock-absorbing member including a double-sided adhesive tape attaching the display panel to the supporting member and disposed between the display panel and the supporting member,
wherein an end of the first side wall is positioned in a periphery of the front cover,
wherein the plurality of supporting protrusions are supported by corresponding inner surfaces of the case member to couple the supporting member to the case member, and
wherein the supporting member supports a first side wall of the case member and resists deformation of the first side wall when an external force is applied to the case member.

2. The electronic device of claim 1, wherein the shock-absorbing member is attached to an overall surface of the display panel and at least a portion of a side wall of the display panel.

3. The electronic device of claim 1, further comprising:
a battery disposed between the case member and the supporting member;
an opening formed in at least a portion of an area corresponding to the battery on the supporting member; and
at least one clamping boss formed in the supporting member and disposed adjacent to the opening.

4. The electronic device of claim 1, further comprising:
a plurality of through-holes formed to pass from a side surface of the case member through an inside of the case member,
wherein the through-holes are positioned in at least one side surface of the case member and between a central portion of the case member and a lengthwise end of the case member or between the central portion and another lengthwise end of the case member.

5. An electronic device comprising:
a supporting member including a plurality of supporting protrusions formed along a side surface thereof;
a case member coupled with the supporting member to surround the side surface of the supporting member;
a plurality of through-holes formed to pass from a side surface of the case member through an inside of the case member, and positioned in at least one side surface of the case member and between a central portion of the case member and a lengthwise end of the case member or between the central portion and another lengthwise end of the case member;
a plurality of clamping bosses formed along the periphery of the supporting member, wherein at least some of the through-holes and the clamping bosses are alternately arranged when viewed from a front surface of the case member;
a front cover coupled to a front surface of the case member, surrounded by the case member, and attached to a first surface of the supporting member, the front cover including a window member positioned in a front surface of the case member, and a display panel disposed in an inside surface of the window member; and
a shock-absorbing member including a double-sided adhesive tape attaching the display panel to the supporting member and disposed between the display panel and the supporting member,
wherein the plurality of supporting protrusions are supported by corresponding inner surfaces of the case member to couple the supporting member to the case member, and
wherein the plurality of supporting protrusions support a first side wall of the case member and resists deformation of the first side wall when an external force is applied to the case member.

6. A device comprising:
an outer housing including:
a first plate,
a second plate oriented in an opposite direction of the first plate, and
a side member at least partially surrounding a space between the first plate and the second plate;
a plurality of through-holes formed to pass from a side surface of the side member through an inside of the side member;
a mid-structure disposed in the outer housing, including:
a first surface facing the first plate,
a second surface facing the second plate, and
a third surface facing at least a portion of the side member and at least partially surrounded by the side member;
a plurality of clamping bosses formed along the periphery of the mid-structure, wherein at least some of the through-holes and the clamping bosses are alternately arranged when viewed from a front surface of the side member;
a display module disposed between the mid-structure and the first plate; and
a shock-absorbing member including a double-sided adhesive tape attaching the display module to the mid-structure and disposed between the display module and the mid-structure, wherein at least a portion of a side surface of the first plate is surrounded by the at least a portion of the side member while spaced apart at a first interval, wherein at least a portion of the third surface of the mid-structure is positioned adjacent to at least another portion of the side member while spaced apart from a second interval, wherein the second interval is smaller than the first interval, wherein the through-holes are positioned in at least one side surface of the side member and between a central portion of the side member and a lengthwise end of the side member or between the central portion and another lengthwise end of the side member, and wherein the at least a portion of the third surface supports the at least another portion of the side member and resists deformation of the side member when an external force is applied to the outer housing.

7. The device of claim 6, wherein the mid-structure is a plate-shaped structure and includes at least one opening passing through the first surface and the second surface.

8. The device of claim 6, wherein the third surface includes at least one protrusion projecting to the side member, and wherein a portion or a surface of the protrusion facing the side member is spaced apart from the side member at the second interval.

9. The device of claim 6, wherein the mid-structure includes a long periphery and a short periphery as viewed from above the first surface, and wherein the at least one protrusion is disposed on a portion of the long periphery.

10. The device of claim 6, wherein the mid-structure includes a through-hole formed adjacent to the side member and to pass through the first surface and the second surface, and wherein the mid-structure is detachably coupled with the side member by a coupling member coupled to the second plate through the through-hole.

11. The device of claim 10, wherein the coupling member includes a screw or a rivet.

12. The device of claim 6, further comprising:

a battery disposed between the mid-structure and at least a portion of the second plate.

13. The device of claim 6, wherein the mid-structure includes a metallic material.

14. The device of claim 6, further comprising:

a printed circuit board disposed between the mid-structure and at least a portion of the second plate.

* * * * *